(12) United States Patent
Garcia de Gorordo (10) Patent No.: US 10,656,029 B2
(45) Date of Patent: May 19, 2020

(54) PROCESSING SYSTEM HAVING OPTICAL TEMPERATURE MEASUREMENT SUBSYSTEM

(71) Applicant: APPLIED MATERIALS, INC., Santa Clara, CA (US)

(72) Inventor: Alvaro Garcia de Gorordo, East Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 294 days.

(21) Appl. No.: 15/495,906

(22) Filed: Apr. 24, 2017

(65) Prior Publication Data

US 2018/0306650 A1 Oct. 25, 2018

(51) Int. Cl.
*G01K 11/20* (2006.01)
*G01K 11/12* (2006.01)

(52) U.S. Cl.
CPC ............ *G01K 11/20* (2013.01); *G01K 11/125* (2013.01)

(58) Field of Classification Search
USPC ................. 374/120, 121, 131, 141, 208, 161
See application file for complete search history.

(56) References Cited

U.S. PATENT DOCUMENTS

| 5,098,199 A | 3/1992 | Amith |
| 8,696,197 B2 | 4/2014 | Timans |
| 2002/0189757 A1* | 12/2002 | Denton ................. G01K 11/12 156/345.27 |
| 2008/0267257 A1 | 10/2008 | Herchen |
| 2012/0012756 A1* | 1/2012 | Beck .................. G01N 21/6489 250/459.1 |
| 2015/0221535 A1 | 8/2015 | Nguyen et al. |
| 2016/0123816 A1* | 5/2016 | Pei ............................ G01J 5/12 374/121 |
| 2016/0161294 A1* | 6/2016 | Ip ............................ G01D 5/34 250/578.1 |

* cited by examiner

*Primary Examiner* — Mirellys Jagan
(74) *Attorney, Agent, or Firm* — Schwabe, Williamson & Wyatt, P.C.

(57) ABSTRACT

Embodiments include processing equipment. A processing system having an optical temperature measurement subsystem is described. In an example, the optical temperature measurement subsystem includes a light source to direct an excitation light into a process chamber, and a photosensitive array to detect a response light received from the process chamber. The detected light can be monitored to determine a temperature of a substrate mounted within the process chamber. Other embodiments are also described and claimed.

15 Claims, 5 Drawing Sheets

PROCESSING SYSTEM HAVING OPTICAL TEMPERATURE MEASUREMENT SUBSYSTEM

BACKGROUND

1) Field

Embodiments relate to the field of semiconductor processing and, in particular, to devices and methods for measuring a temperature within a process chamber.

2) Description of Related Art

In-situ temperature measurements of processing systems provide temperature information that facilitates advanced processes, e.g., semiconductor device manufacturing processes. The in-situ temperature measurements can allow processes to be characterized and processing systems to be qualified. Characterization and qualification of the processes and equipment can include mapping thermal variations, which may have an effect on process results. Spatial temperature variations within a process chamber can affect an accuracy of wafer patterning, e.g., can lead to patterning errors.

Typical in-situ measurement systems for measuring process chamber temperatures include metrology devices that can be brought into a process chamber for temperature measurement, and then removed from the process chamber. The metrology devices can include on-board electronics, e.g., temperature sensors, an integrated circuit, and a battery, that are positioned directly within the process chamber to obtain temperature data. The temperature data can be stored in on-board memory for future analysis.

SUMMARY

Embodiments of a processing system having an optical temperature measurement subsystem include a light source to emit an excitation light, and a photosensitive array to detect a response light. In an embodiment, the processing subsystem includes a process chamber around a support member. A specialized substrate can be mounted on a top surface of the support member, and a temperature of the specialized substrate can be measured by the optical temperature measurement subsystem.

The optical temperature measurement subsystem can measure the temperature of the substrate using a bandgap energy method or a phosphor thermometry method. Accordingly, the subsystem can include a light source to emit an excitation light toward the substrate, and a photosensitive array to receive a response light reflected or emitted by the substrate. The light source can emit the excitation light in a collimated beam, and the photosensitive array can receive the response light in a collimated beam. An optical lens may be mounted on the chamber body between the light source and the substrate to diverge the excitation light into a wide beam spot. The optical lens can converge the response light returning from the substrate to the photo sensitive array. Accordingly, the photosensitive array can image most or all of a top surface of the substrate. A processor of optical temperature measurement subsystem can determine a temperature of the top surface based on the detected response light in the image.

The substrate can be configured for use in the bandgap energy method or the phosphor thermometry method to determine the substrate temperature. For example, the substrate may have a wafer form factor and be fabricated from a bandgap semiconductor material such as gallium arsenide. Alternatively, the substrate may have a core layer coated by a phosphorescent coating to luminesce response light when irradiated by excitation light.

In an embodiment, a method of measuring a temperature of the substrate includes mounting the substrate within a chamber volume of the process chamber. A top surface of the substrate can be irradiated by a light source by diffusing excitation light from a collimated beam to a broad beam spot on the top surface. Similarly, the response light can converge through the optical lens into a collimated beam to be detected by a photosensitive array. The method can include determining a surface temperature of the top surface of the substrate based on the detected response light. For example, a decay rate of a light intensity of the response light may be determined, and the decay rate may be used to identify a corresponding temperature in a look-up table. Similarly, the surface temperature can be determined by identifying a corresponding temperature for a determined reflectance of the top surface of the substrate, based on the detected response light.

The above summary does not include an exhaustive list of all aspects. It is contemplated that all systems and methods are included that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Devices and methods used for in-situ temperature measurement of manufacturing targets and processing equipment are described in accordance with various embodiments. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

Existing methods of in-situ temperature measurement may not be able to meet the demands of next-generation wafer fabrication processes. Metrology devices having on-board electronics are typically limited in temperature ranges because the components, e.g., memory devices or batteries, can be damaged outside of normal operating conditions. Existing metrology devices may have a temperature capability of 20-100° C. Electrostatic chucks used in next-generation wafer fabrication processes, however, may operate across a temperature range of −150° C. to 250° C. Existing metrology devices could be damaged by such processes. Damage could include battery ruptures, which may contaminate the chamber. Furthermore, existing metrology devices may require venting of a process chamber and removal of the devices for future analysis of temperature data, which can be a time-consuming process. In addition, existing metrology devices have a limited number of temperature sensors, and thus, cannot measure fine spatial details. Missing details can lead to blind spots and failure to detect localized hot spots. Accordingly, in-situ temperature measurement systems having a robust temperature capability and real-time temperature data results are needed.

In an aspect, a processing system having a non-contact, in-situ temperature measurement system is provided. The temperature measurement system can measure a temperature of a surface within a process chamber using optical temperature measurements. For example, an optical temperature measurement subsystem can emit an excitation light toward a substrate mounted in the process chamber when the process chamber is under vacuum, and a response light may return from the substrate and be detected to determine a temperature of the substrate. The temperature measurement can be made in real-time without venting the process chamber. Furthermore, the optical temperature measurements can be made across a wide temperature range, since the electronics of the system are located outside of the process chamber.

Figure 1:
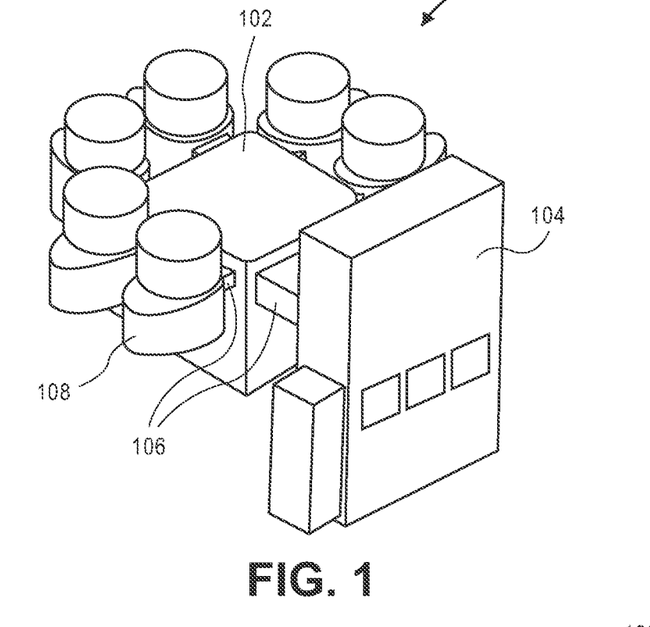
FIG. 1 is a perspective view of a processing system, in accordance with an embodiment.

Referring to FIG. 1, a perspective view of a processing system is shown in accordance with an embodiment. A processing system 100 may be used to manufacture a wafers, a substrate, or another manufacturing target, and thus, may be referred to as a wafer processing system without limitation. Processing system 100 may include a buffer chamber 102 physically connected to a factory interface 104 by one or more load locks 106. Furthermore, one or more process chambers 108 may be physically connected to buffer chamber 102 by one or more respective load locks 106. Buffer chamber 102 may essentially act as an intermediate volume, larger than respective volumes of process chambers 108, that remains at a low pressure, albeit at a pressure higher than the process pressures within process chambers 108. Thus, a semiconductor wafer, e.g., a silicon wafer, may be moved between chambers of processing system 100 under vacuum conditions during the manufacture of semiconductor devices. Similarly, a substrate used for non-contact temperature measurement, as described below, may be moved between chambers of processing system 100. This movement may be enabled by various devices included in the processing system 100, e.g., robotic arms, shuttles, etc.

Various manufacturing operations may be performed in process chambers 108. For example, at least one of process chambers 108 may be a plasma etch chamber, a deposition chamber, or any other semiconductor process tool chamber. As such, process chamber 108 may be used to perform manufacturing processes under vacuum conditions and at elevated or lowered temperatures. For robust manufacturing, it may be useful to determine temperature variations across the process chamber 108, and more particularly, across a region of process chamber 108 that holds a wafer during manufacturing. It is also useful to measure chamber-to-chamber variations in chamber temperature distributions.

Figure 2:
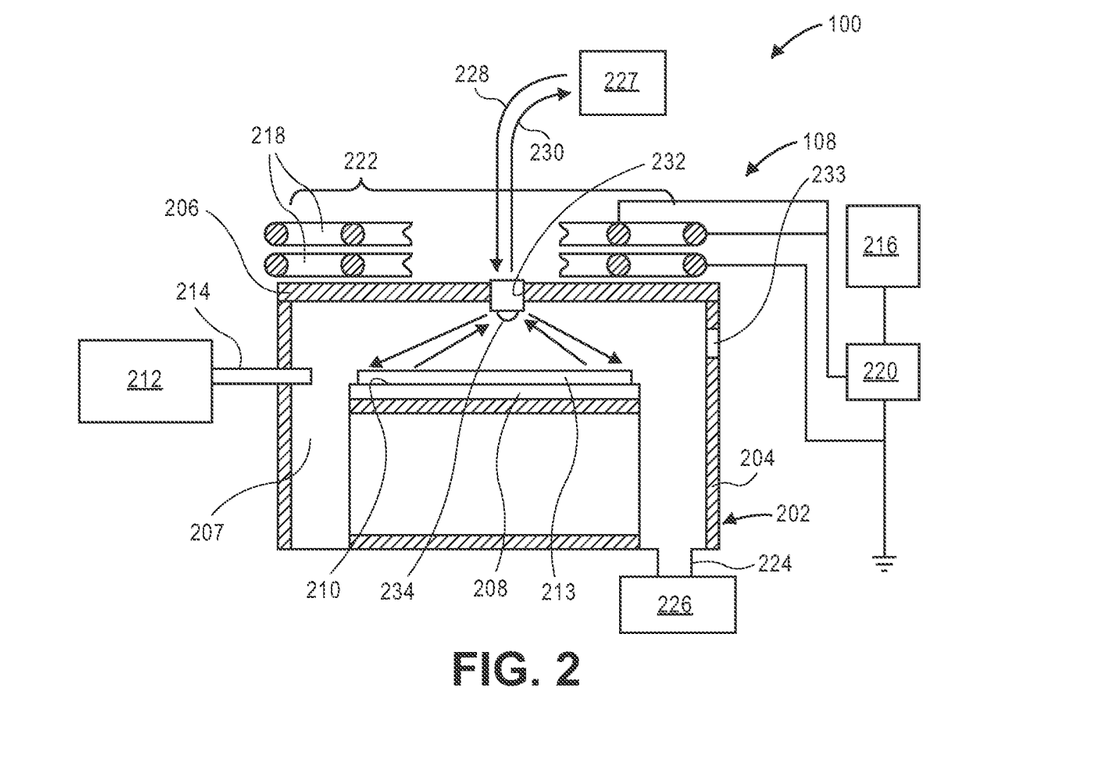
FIG. 2 is a schematic of a processing system, in accordance with an embodiment.

Referring to FIG. 2, a schematic of a processing system is shown in accordance with an embodiment. Process chamber 108 of processing system 100 may be a plasma etch chamber, a capacitive coupled parallel plate chamber, or a magnetically enhanced ion etch chamber. Accordingly, the particular embodiment of process chamber 108 illustrated in FIG. 2 is illustrative, and not limiting. Process chamber 108 may include a chamber body 202. Chamber body 202 can include a chamber wall 204, e.g., a cylindrical sidewall, and a chamber lid 206 mounted on chamber body 202. Chamber lid 206 may be flat, rectangular, arcuate, conical, dome or multi-radius shaped. Chamber body 202 may also include a chamber bottom, and thus, a chamber volume 207 can be enclosed within chamber body 202 between chamber wall 204, chamber lid 206, and chamber bottom.

A support member 208 may be disposed within the chamber volume 207. Support member 208 may hold a substrate, a wafer, or another manufacturing target, and thus, may be referred to as a substrate support member without limitation. More particularly, chamber body 202 may extend around support member 208. In an embodiment, support member 208 has a top support surface 210 to support a substrate 213 within process chamber 108. For example, substrate 213 may be mounted on support member 208 during an etching process. When substrate 213 is loaded onto support member 208, processing system 100 may be referred to as an etching process assembly. Support member 208 may be a conventional mechanical or electrostatic chuck with at least a portion of the support member 208 being electrically conductive and capable of serving as a process bias cathode. In an embodiment, support member 208 includes a pedestal or a platform to hold substrate 213.

Heat may be transferred to substrate 213 within process chamber 108. For example, support member 208 may be heated or cooled to transfer heat to or from substrate 213 when substrate 213 is mounted on support member 208. In an embodiment, support member 208 may heat or cool substrate 213 to perform manufacturing processes at elevated temperatures between room temperature and 400° C., e.g., up to 250° C., or at lowered temperatures between room temperature and −200° C., e.g., down to −150° C.

Process chamber 108 can include a process gas source 212 configured to introduce process gases into the chamber volume 207 through a gas distributor 214. Gas distributor 214 may be peripherally disposed about support member 208 and/or disposed in chamber lid 206. Mass flow controllers (not shown) for each process gas, or alternatively, for mixtures of the process gas, may be disposed between the chamber body 202 and the process gas source 212 to regulate the respective flow rates of the process gases.

In an embodiment, a plasma zone is defined in chamber volume 207 between support member 208 and chamber lid 206. A plasma is generated in the plasma zone from the process gases by supplying power from a power supply 216, e.g., a coil power supply, to one or more radio frequency (RF) coils 218 through an RF match network 220. Process chamber 108 can include at least one inductive coil 218 disposed above at least a portion of chamber lid 206. In the embodiment depicted in FIG. 2, two concentric inductive coils 218 are shown. The one or more RF coils 218 can extend around a central region 222. RF coils 218 represent one manner of providing energy, but other manners exist. For example, an RF plane, as used for a capacitively coupled plasma (CCP), may also be used in place of RF coils 218. Alternatively, microwave antennas (both slotted and waveguide versions) may be used in place of RF coils 218.

Process gases and etchant byproducts are exhausted from process chamber 108 through an exhaust port 224 to an exhaust system, e.g., a vacuum system 226. Exhaust port 224 may be disposed in chamber body 202, e.g., within a chamber bottom, for removal of process gases. A chamber pressure in chamber volume 207 can be controlled by operation of vacuum system 226. In an embodiment, vacuum system 226 may control the chamber pressure to perform manufacturing processes under vacuum conditions in the $10^{-6}$ Torr range or lower, e.g., in the $10^{-8}$ Torr range.

In an embodiment, processing system 100 includes an optical temperature measurement subsystem 227. Optical temperature measurement subsystem 227 may be mounted on or near process chamber 108. Optical temperature measurement subsystem 227 may include electronics, as described further below, and the electronics of optical temperature measurement subsystem 227 can be mounted outside of central region 222. For example, a light source and a photosensitive array of optical temperature measurement subsystem 227 may be outside of central region 222 and RF fields generated by RF coils 218. When alternative power sources are used, e.g., an RF plane or a microwave antenna, the light source and photosensitive array may be located outside of an energy field created by the power source. Thus, the electronic components may be protected from RF fields during chamber operation.

As described further below, optical temperature measurement subsystem 227 can direct light along a forward light path 228 through chamber body 202 toward support member 208 and/or substrate 213 mounted on support member 208. More particularly, light may be directed along forward light path 228 toward top support surface 210. Similarly, light may return to a photodetector of optical temperature measurement subsystem 227 along a return light path 230 from support member 208 and/or substrate 213 mounted on support member 208.

Light directed toward or away from support member 208 may follow forward light path 228 and return light path 230 through a portion of chamber body 202. In an embodiment, chamber lid 206 includes one or more lid windows 232. A lid window 232 may be an optical access port or viewport in chamber lid 206. Similarly, one or more optical access ports or viewports may be located in chamber wall 204, e.g., a wall window 233, or a chamber bottom to allow light to transfer into and out of the chamber volume 207 through chamber body 202. Lid window 232 may be at a center of chamber lid 206, or located along an axis of symmetry passing through substrate 213 mounted on support member 208. The optical access port(s) may generally comprise a flat window made of quartz or other materials that transmits light over a broad wavelength spectrum and resists plasma etching.

In an embodiment, optical temperature measurement subsystem 227 includes an optical lens 234 mounted on chamber body 202. For example, optical lens 234 may be mounted in, above, or below lid window 232. Light may be directed along forward light path 228 through lid window 232 in chamber lid 206, or wall window 233 in chamber wall 204, via optical lens 234. More particularly, optical lens 234 may direct light from outside of process chamber 108 through lid window 232 toward top support surface 210 of support member 208.

Figure 3:
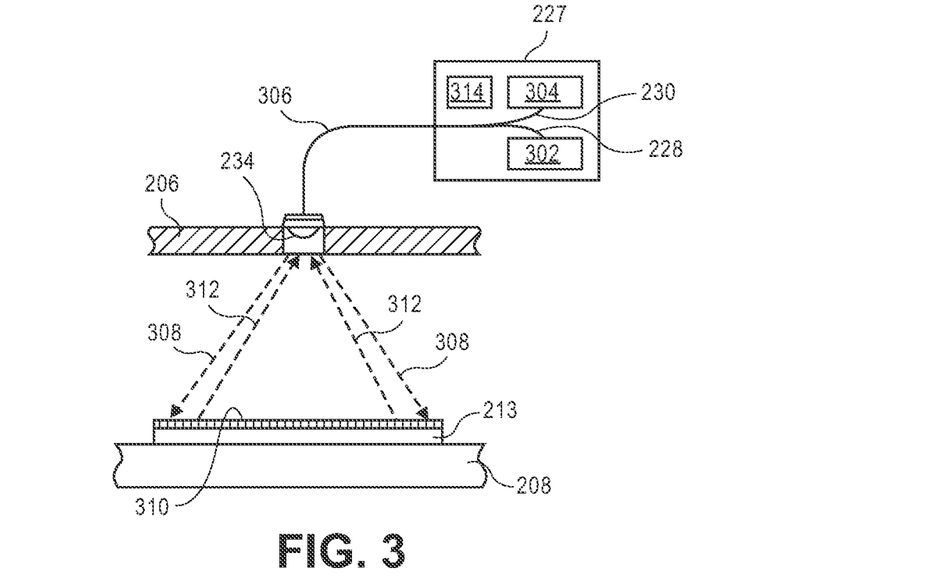
FIG. 3 is a diagram of an optical configuration of a processing system, in accordance with an embodiment.

Referring to FIG. 3, a diagram of an optical configuration of a processing system is shown in accordance with an embodiment. Optical temperature measurement subsystem 227 uses optical methods to measure a temperature within process chamber 108. In an embodiment, optical temperature measurement subsystem 227 includes a light source 302 to emit an excitation light 308 along forward light path 228. Optical temperature measurement subsystem 227 may also include a photosensitive array 304 to detect a response light 312 returning along return light path 230.

In an embodiment, processing system 100 includes an image transfer element 306. Image transfer element 306 can be a coherent fiber bundle, e.g., a fiber optic cable, extending between one or more of light source 302 or photosensitive array 304, and optical lens 234. Alternatively, image transfer element 306 may be another optical mechanism, such as an optical conduit. The optical conduit can be a rigid, fused fiber bundle in an embodiment. Furthermore, image transfer element 306 may be an optical image transmission element, such as lenses or mirrors. Image transfer element 306 may contain forward light path 228 between light source 302 and optical lens 234. Similarly, image transfer element 306 may contain return light path 230 between optical lens 234 and photosensitive array 304. Light may travel through image transfer element 306 in a parallel direction, and the light between optical lens 234 and light source 302 or photosensitive array 304 may be collimated. More particularly, light source 302 can emit excitation light 308 in a first collimated beam along forward light path 228, and photosensitive array 304 may receive response light 312 in a second collimated beam along return light path 230.

Optical lens 234 can be mounted in chamber lid 206 above substrate 213 and support member 208. In an embodiment, optical lens 234 can diverge excitation light 308 to follow forward light path 228 downward from chamber lid 206 to a top substrate surface 310 of substrate 213. Substrate 213 may have a wafer form factor, as described below, and in an embodiment, excitation light 308 is spread out to illuminate an entirety of top substrate surface 310.

A response light 312 may return to optical lens 234 from top substrate surface 310 along return light path 230. Response light 312 may be converged by optical lens 234 into image transfer element 306. Accordingly, optical lens 234 may spread excitation light 308 outward to excite top substrate surface 310, and may collect and condense response light 312 returning from top substrate surface 310, which carries information about temperature of substrate 213.

Light collected by optical lens 234 can be imaged by photosensitive array 304. Photosensitive array 304 can be selected based on a required sensitivity of optical temperature measurement subsystem 227. For example, for low sensitivity, photosensitive array 304 may be a charge coupled device (CCD) type array. Alternatively, for high sensitivity, photosensitive array 304 may be an avalanche photodiode (APD) type array. Photosensitive array 304 can capture image frames at a speed higher than 1 kHz to provide the necessary temporal resolution in temperature detection using the methodologies described below.

Optical temperature measurement subsystem 227 can include a computer portion 314 to determine a temperature based on detected response light 312. More particularly, computer portion 314 can include a processor (FIG. 9) to determine a spatial temperature distribution of substrate 213 mounted on support member 208 within process chamber 108. Specific methodologies of temperature determination are described further below with respect to FIGS. 7-8. The methodologies include the use of phosphor thermometry and bandgap energy methods.

Figure 4:
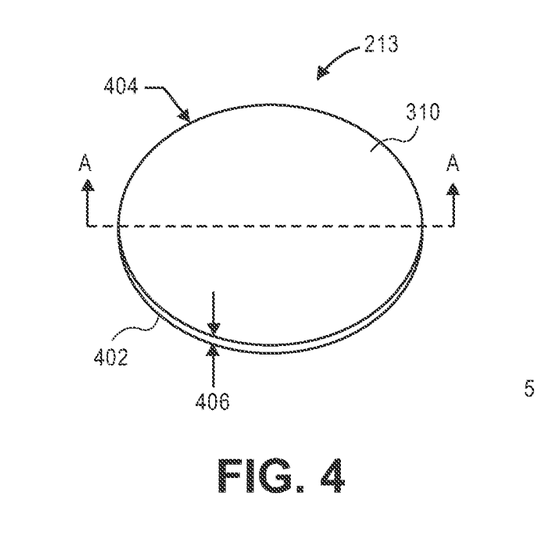
FIG. 4 is a perspective view of a substrate used for optical temperature measurement of a processing system, in accordance with an embodiment.

Referring to FIG. 4, a perspective view of a substrate used for optical temperature measurement of a processing system is shown in accordance with an embodiment. Substrate 213 used for spatial temperature measurement may be configured to be moved between chambers, e.g., between buffer chamber 102 and/or process chambers 108, of processing system 100. For example, substrate 213 may include a wafer substrate having an overall form factor and/or a same material and shape as a semiconductor wafer. That is, substrate 213 may have a wafer form factor. The wafer form factor can be essentially disc-shaped and include top substrate surface 310 to receive excitation light 308 and to give off response light 312. Top substrate surface 310 may be on an opposite side of wafer form factor from a bottom substrate surface 402 (hidden) that is mounted on support member 208. For example, the bottom substrate surface 402 may be placed on mounting pins or mesas of an electrostatic chuck.

Substrate 213 may have a diameter 404 and a thickness 406. Diameter 404 may be a dimension defining a circular area irradiated by excitation light 308. Thickness 406 may be a distance between top substrate surface 310 and bottom substrate surface 402. In an embodiment, diameter 404 is between 95 to 455 mm, e.g., diameter 404 may nominally be 100 mm, 300 mm, or 450 mm. In an embodiment, thickness 406 is less than 1 mm, e.g., 525 µm, 775 µm, or 925 µm. Thickness 406 may also be greater than 1 mm, e.g., several millimeters up to 10 mm. Accordingly, substrate 213 may be manufactured using readily available wafer materials and typical wafer manufacturing processes and equipment, and may essentially simulate a semiconductor wafer when processed by processing system 100.

Figure 5A:
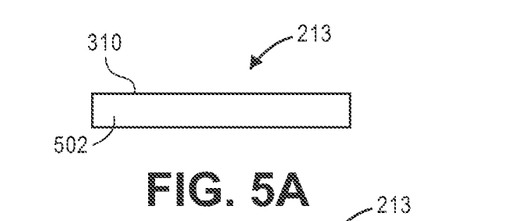
FIGS. 5A-5B are sectional views, taken about line A-A of FIG. 4, of a substrate used for optical temperature measurement of a processing system, in accordance with an embodiment.

Referring to FIG. 5A, a sectional view taken about line A-A of FIG. 4 of a substrate used for optical temperature measurement using a band-gap method is shown in accordance with an embodiment. Optical temperature measurement subsystem 227 may use a bandgap energy method to determine a temperature of substrate 213 within process chamber 108. More particularly, optical temperature measurement subsystem 227 may determine the temperature of substrate 213 based on light absorbed by substrate 213. In an embodiment, substrate 213 used for the bandgap energy method can include a semiconductor material 502 having a predetermined temperature-dependent bandgap. Substrate 213 may be a full crystal substrate of semiconductor material 502. For example, semiconductor material 502 may be gallium arsenide (GaAs) or another direct bandgap semiconductor. Semiconductor material 502 may be an indirect bandgap semiconductor. Accordingly, the bandgap of semiconductor material 502 may depend on a temperature of substrate 213, and the bandgap may shift as substrate 213 is heated or cooled.

Figure 5B:
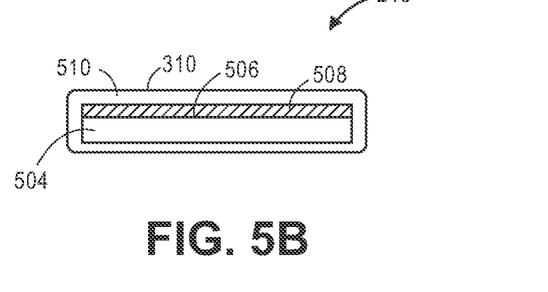

Referring to FIG. 5B, a sectional view taken about line A-A of FIG. 4 of a substrate used for optical temperature measurement using a phosphorescent method is shown in accordance with an embodiment. Optical temperature measurement subsystem 227 may use phosphor thermometry to determine a temperature of substrate 213 within process chamber 108. More particularly, optical temperature measurement subsystem 227 may determine the temperature of substrate 213 based on a luminescence of substrate 213. That is, when top substrate surface 310 is irradiated by excitation light 308, substrate 213 may emit response light 312 as luminescence.

In an embodiment, substrate 213 includes a core layer forming a majority of a volume of substrate 213. For example, the core layer may be a silicon substrate 504 having diameter 404 and at least 90% of thickness 406. Alternatively, the core layer may be a carbon substrate. Silicon substrate 504 can include a top surface 506 covered by a phosphorescent material. For example, a phosphorescent coating 508 may be disposed on top surface 506 of silicon substrate 504. Phosphorescent coating 508 can include a known phosphorescent material. Examples of phosphors that may be included in phosphorescent coating 508 include $La_2O_2S$:Eu, $YVO_4$:Dy, $Y_2O_3$:Dy, and YAG:Cr. Phosphorescent coating 508 may cover an entire area of top surface 506. Accordingly, excitation light 308 impinging on top substrate surface 310 can excite the entire area of phosphorescent coating 508.

In an embodiment, substrate 213 includes a protective layer 510 to protect the underlying phosphorescent coating 508. Protective layer 510 may be selected from the silicon oxide family of materials. For example, protective layer 510 may be quartz or fused silica. Protective layer 510 can be optically transparent. More particularly, protective layer 510 may be transparent to the wavelengths of excitation light 308 and response light 312. Protective layer 510 can cover an entire upper surface of phosphorescent layer. In an embodiment, protective layer 510 encases phosphorescent material and/or silicon substrate 504. For example, protective layer 510 may encapsulate the core layer and the luminescent layer of substrate 213.

Figure 6:
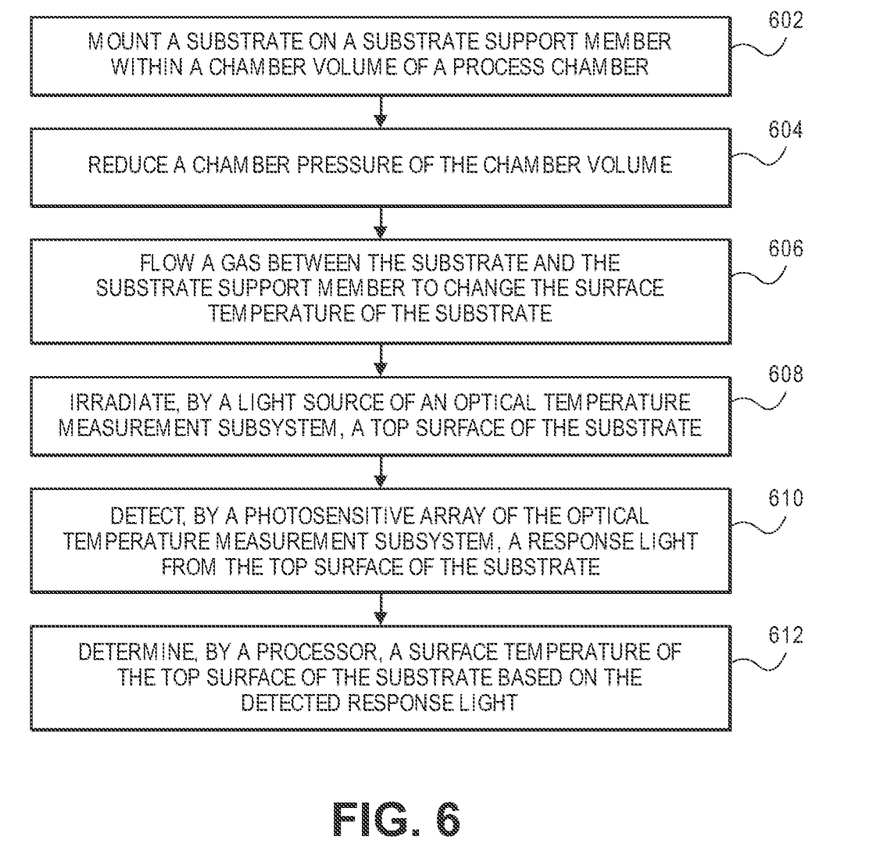
FIG. 6 is a flowchart representing operations in a method of optically measuring a temperature of a substrate, in accordance with an embodiment.

Referring to FIG. 6, a flowchart representing operations in a method of optically measuring a temperature of a substrate is shown in accordance with an embodiment. At operation 602, substrate 213 is mounted on support member 208. Substrate 213 can be inserted into process chamber 108 through load lock 106 and lowered onto top support surface 210. Support member 208 may be an electrostatic chuck, and thus, support member 208 may be activated to clamp substrate 213. Accordingly, substrate 213 may be held by support member 208 within chamber volume 207.

Optionally, at operation 604, a chamber pressure of chamber volume 207 is reduced. Vacuum system 226 may drive vacuum to evacuate air within chamber volume 207. Accordingly, a process may be carried out under vacuum conditions. The process may include striking a plasma within chamber volume 207. Heat may be transferred into or out of chamber volume 207 through support member 208. For example, support member 208 may be heated or cooled to change a temperature of substrate 213. Optionally, at operation 606, a gas can be flowed between a bottom surface 402 of substrate 213 and top support surface 210. The gas can be a gas for heat exchange, such as helium or nitrogen gas. As the gas flows between substrate 213 and support member 208, the temperature of substrate 213 may change. That is, the gas can raise or lower the temperature to regulate a temperature gradient across substrate 213 and/or top substrate surface 310. Optical temperature measurement subsystem 227 can measure the temperature gradient.

At operation 608, light source 302 irradiates top substrate surface 310. In an embodiment, the plasma within chamber volume 207 may be turned to an off state prior to sending excitation light 308 to top substrate surface 310 for temperature measurement. This can prevent interference between light from the plasma and excitation light 308 or response light 312. The chamber pressure may be maintained under a vacuum condition during irradiation. More particularly, irradiating substrate 213 by emitting excitation light 308 through chamber lid 206 of process chamber 108 may occur when the chamber pressure is reduced below atmospheric pressure.

A wavelength of excitation light 308 can be selected based on a temperature measurement method and an expected temperature of substrate 213. For example, when optical temperature measurement subsystem 227 uses the bandgap energy method of temperature measurement, and substrate 213 is expected to be near room temperature, light source 302 may emit excitation light 308 having a wavelength of 850-900 nm, e.g., 870 nm. Similarly, when optical temperature measurement subsystem 227 uses phosphor thermometry to measure temperature and substrate 213 is expected to be near 0° C., light source 302 may emit excitation light 308 having a wavelength of 514 nm. By contrast, when substrate 213 is expected to be near −200° C., light source 302 may emit excitation light 308 having a wavelength of 430 nm, and when substrate 213 is expected to be near 200° C., light source 302 may emit excitation light 308 having a wavelength of 538 nm. A selected wavelength of excitation light 308 may also depend on a material of phosphorescent coating 508. For example, the wavelengths described above may correspond to a phosphorescent coating of $La_2O_2S:Eu$, but the wavelengths may be changed when phosphorescent coating 508 is a different material, such as $YVO_4:Dy$. In an embodiment, light source 302 is a pulsing light source 302.

As described above, excitation light 308 can be directed to optical lens 234 as a collimated beam, and then diffused through optical lens 234 to spread radially outward from an optical axis passing vertically through optical lens 234 normal to top substrate surface 310. Excitation light 308 may be expanded such that a beam spot encompasses all or nearly all of top substrate surface 310. A diameter 404 of the beam spot may be at least 25% of diameter 404 of substrate 213. For example, diameter 404 may be 300 mm, and the beam spot may have a diameter of 75 mm.

In an embodiment, excitation light 308 may be diffused to cover an area less than the entire top substrate surface 310 area. The probing light may be scanned over top substrate surface 310, e.g., using a moving mirror or other mechanisms to alter a relative vertical alignment between optical lens 234 and top substrate surface 310. As the beam spot is scanned across the substrate surface, response light 312 may be detected and light values, e.g., light intensity or reflectance values, may be stored in system memory for further analysis.

At operation 610, photosensitive array 304 detects response light 312 from top substrate surface 310. Response light 312 may be reflected from top substrate surface 310 in the case of bandgap energy method detection, or response light 312 may be emitted, e.g., as luminescence, from phosphorescent coating 508. Response light 312 can be collected through lid window 232 or through wall window 233. Light collection may be through optical lens 234 mounted on chamber body 202. Response light 312 may travel radially inward from substrate top surface 506 toward an optical axis passing vertically through optical lens 234. Optical lens 234 can converge response light 312 into a collimated beam. Accordingly, optical lens 234 may collimate light from an entire top substrate surface 310, e.g., from all areas of top substrate surface 310 within a perimeter of substrate 213. The collimated image can be transferred by image transfer element 306, or another optical transfer method as described above to photosensitive array 304. For example, the optical transfer method may include mirrors, lenses, or optical guides. The optical transfer method may preserve the spatial integrity of the temperature measurement.

At operation 612, a processor (FIG. 9) of computer portion 314 can determine a surface temperature of substrate 213 based on the detected response light 312. That is, the surface temperature of a special substrate 213 used for temperature measurement may be determined. The special substrate 213 can be passed into and out of process chamber 108, as described above. It will be appreciated that temperature sensing of top substrate surface 310 differs from, e.g., temperature sensing of a bottom surface of a non-specialized wafer that is being currently processed. The processor can implement signal processing operations to perform a bandgap energy method or phosphor thermometry method. Signal processing by the processor can incorporate known techniques to raise the optical signal of response light 312 out of the noise.

Figure 7:
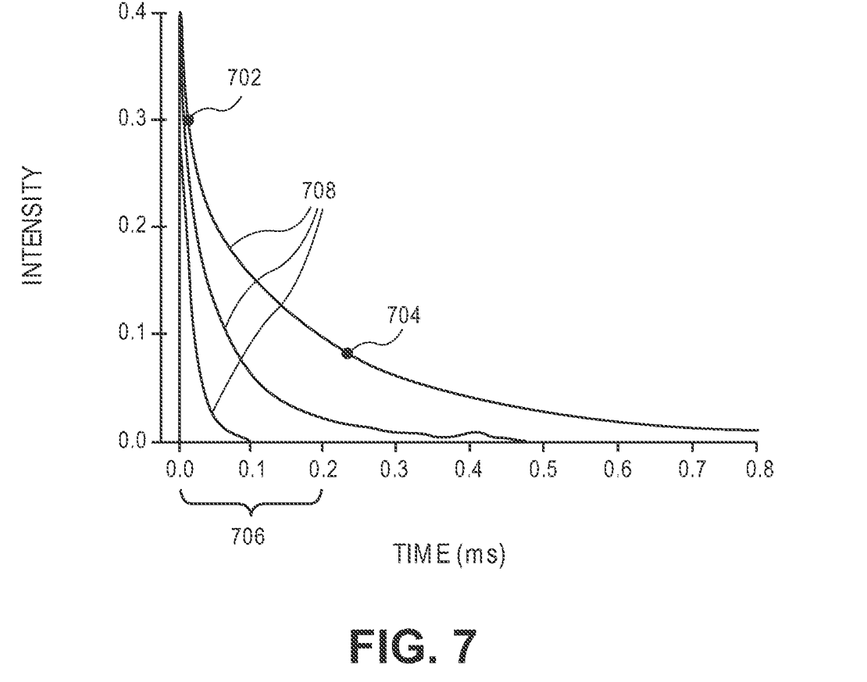
FIG. 7 is a graph of a temperature-dependent decay rate of a response light, in accordance with an embodiment.

Referring to FIG. 7, a graph of a temperature-dependent decay rate of a response light is shown in accordance with an embodiment. Determining surface temperature can include determining a decay rate of a light intensity of response light 312. For example, when phosphorescent coating 508 is stimulated by excitation light 308, response light 312 may be emitted from top substrate surface 310. At an initial time an intensity of response light 312 detected by photosensitive array 304 at a location along top substrate surface 310 may have a first intensity 702. Over time, e.g., after 0.2 ms, the intensity of response light 312 detected by photosensitive array 304 at the location may drop to a second intensity 704. The intensity of response light 312 at the location may drop by a predetermined amount from first intensity 702 to second intensity 704. A period of time corresponding to this predetermined drop may be identified as a decay time 706. For example, decay time 706 may be 0.2 seconds for the intensity to drop by a predetermined value of 66%. The processor may determine a decay rate of response light 312 as the drop in intensity per decay time 706.

In an embodiment, the processor determines the surface temperature of substrate 213 based on the decay rate. The rate at which the intensity of the emission drops off corresponds to a temperature of phosphorescent coating 508. Three decay curves 708 are shown by way of example. For example, the upper curve, which has the lowest decay rate, can indicate that the temperature of the location of phosphorescent coating 508 is a first temperature, e.g., 150° C. The lower curve, which has the highest decay rate, can indicate that the temperature of the location is a second temperature higher than the first temperature, e.g., 200° C. Because the decay rate is temperature dependent, the processor can determine the decay rate and then use a look-up table stored in system memory to determine the corresponding temperature of the location of phosphorescent coating 508. Response light 312 may be gathered from the entire top substrate surface 310, and thus, the processor can analyze decay rates of the received image across the entire surface to form a temperature gradient map for top substrate surface 310.

Figure 8:
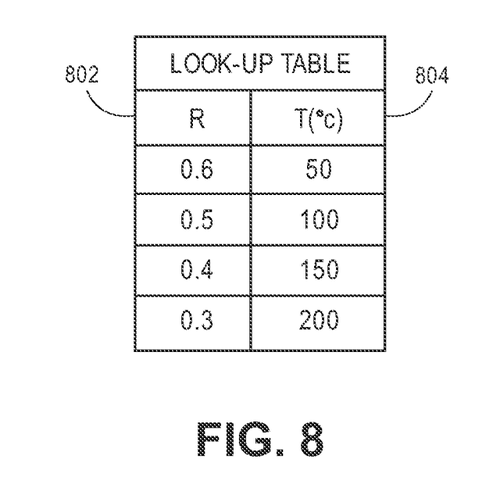
FIG. 8 is a graph of a temperature-dependent reflectance of a substrate is shown in accordance with an embodiment

Referring to FIG. 8, a graph of a temperature-dependent reflectance of a substrate is shown in accordance with an embodiment. Determining the surface temperature of substrate 213 can include determining a reflectance of top substrate surface 310. When substrate 213 is formed from a bandgap semiconductor such as GaAs, a temperature of substrate 213 can be determined based on excitation light 308 absorbed by substrate 213. When the optically active substrate material is stimulated by a particular wavelength of excitement light, the transmittance and reflectance from top substrate surface 310 can be measured. The reflectance varies with temperature of substrate 213, and thus, by determining the reflectance based on response light 312, the processor of computer portion 314 can determine the surface temperature.

Bandgaps can narrow or widen depending on semiconductor material 502 used to form substrate 213. That is, a temperature-dependence of bandgap, and thus, reflectance, of substrate 213 will depend on the material selected for substrate 213. In an embodiment, a reflectance value 802 is determined by determining an amount of excitation light 308 that is detected as response light 312 by photosensitive array 304. The processor can use the detected reflectance value 802 to identify a corresponding temperature 804 in a look-up table stored in system memory. Because the reflectance value 802 varies based on the surface temperature of substrate 213, reflectance value 802 based on response light 312 can be used to determine the surface temperature.

Figure 9:
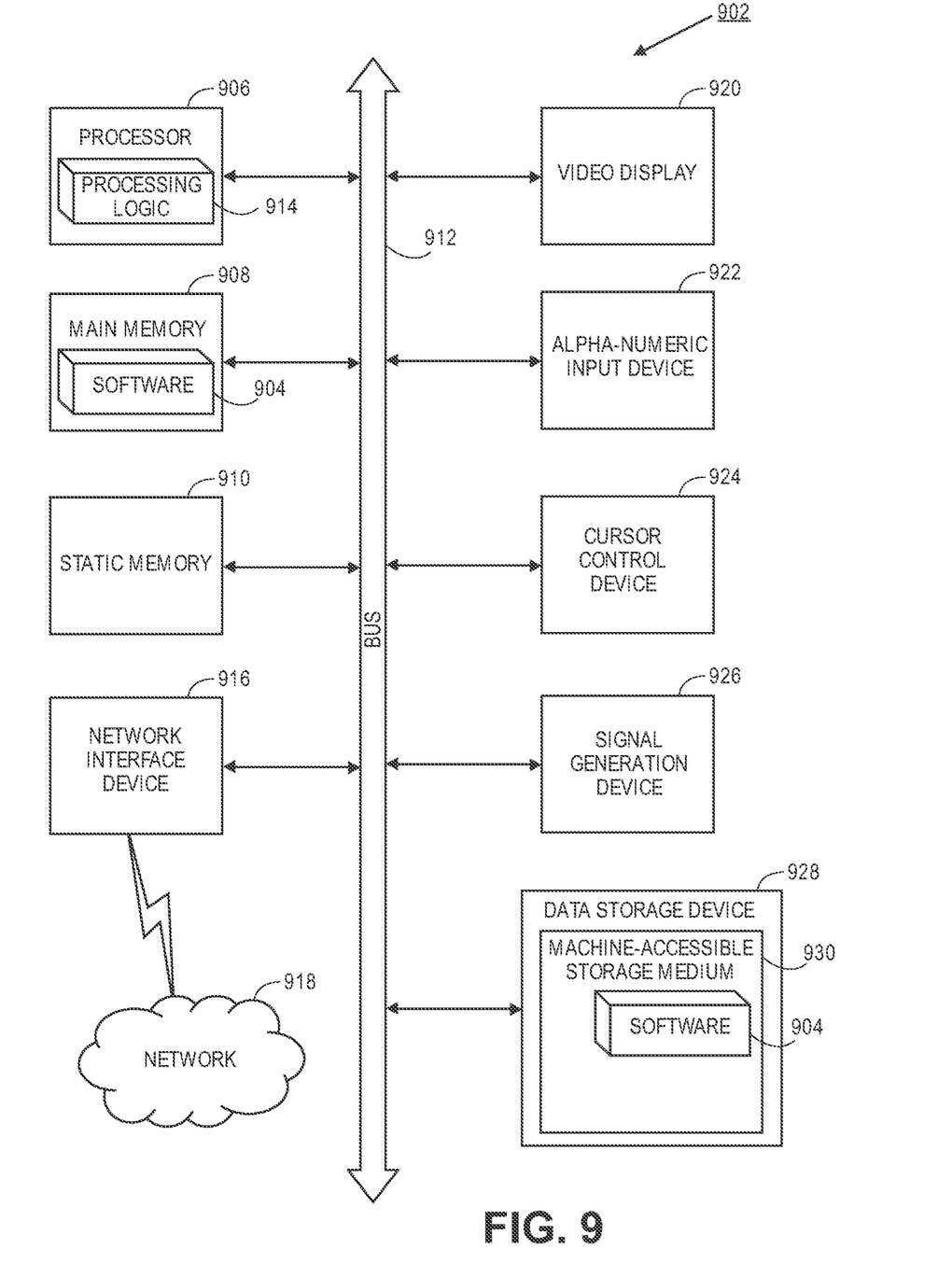
FIG. 9 is a block diagram of an exemplary computer system of a processing system, in accordance with an embodiment.

Referring to FIG. 9, a block diagram of an exemplary computer system of a processing system is shown in accordance with an embodiment. One or more components of the illustrated computer system 902 may be used in electronic circuitry of processing system 100. Accordingly, electronic circuitry of processing system 100, e.g., light source 302, photosensitive array 304, and computer portion 314 discussed above may be a subset of computer system 902. In an embodiment, computer system 902 is coupled to and controls robots, load locks 106, process chambers 108, and other components of processing system 100. Computer system 902 may also receive and analyze response light 312 to perform temperature measurement methods as described above.

Computer system 902 may be connected (e.g., networked) to other machines in a Local Area Network (LAN), an intranet, an extranet, or the Internet. Computer system 902 may operate in the capacity of a server or a client machine in a client-server network environment, or as a peer machine in a peer-to-peer (or distributed) network environment. Computer system 902 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 902, the term "machine" shall also be taken to include any collection of machines (e.g., computers) that individually or jointly execute a set (or multiple sets) of instructions to perform any one or more of the methodologies described herein.

Computer system 902 may include a computer program product, or software 904, having a non-transitory machine-readable medium having stored thereon instructions, which may be used to program computer system 902 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 902 includes a system processor 906, a main memory 908 (e.g., read-only memory (ROM), flash memory, dynamic random access memory (DRAM) such as synchronous DRAM (SDRAM) or Rambus DRAM (RDRAM), etc.), a static memory 910 (e.g., flash memory, static random access memory (SRAM), etc.), and a secondary memory (e.g., a data storage device 928), which communicate with each other via a bus 912.

System processor 906 represents one or more general-purpose processing devices such as a microsystem processor, central processing unit, or the like. More particularly, the system processor 906 may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 906 may also be one or more special-purpose processing devices such as an application specific integrated circuit (ASIC), a field programmable gate array (FPGA), a digital signal system processor (DSP), network system processor, or the like. System processor 906 is configured to execute the processing logic 914 for performing the operations described herein.

The computer system 902 may further include a system network interface device 916 for communicating with other devices or machines, e.g., components of processing system 100, over a network. The computer system 902 may also include a video display unit 920 (e.g., a liquid crystal display (LCD), a light emitting diode display (LED), or a cathode ray tube (CRT)), an alpha-numeric input device 922 (e.g., a keyboard), a cursor control device 924 (e.g., a mouse), and a signal generation device 926 (e.g., a speaker).

The secondary memory may include a data storage device 928 having a machine-accessible storage medium 930 (or more specifically a computer-readable storage medium) on which is stored one or more sets of instructions (e.g., software 904) embodying any one or more of the methodologies or functions described herein. The software 904 may also reside, completely or at least partially, within the main memory 908 and/or within the system processor 906 during execution thereof by the computer system 902, the main memory 908 and the system processor 906 also constituting machine-readable storage media. The software 904 may further be transmitted or received over a network via the system network interface device 916.

While the machine-accessible storage medium 930 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

In the foregoing specification, specific exemplary embodiments have been described. It will be evident that various modifications may be made thereto without departing from the scope of the following claims. The specification and drawings are, accordingly, to be regarded in an illustrative sense rather than a restrictive sense.

What is claimed is:

1. A processing system, comprising:
   a process chamber having a chamber body around a support member having a top support surface;
   a substrate on the support member; and
   an optical temperature measurement subsystem including:
      a light source to emit an excitation light in a first collimated beam,
      an optical lens mounted on the chamber body to diverge the excitation light along a forward light path toward the top support surface of the support member and to converge a response light from the substrate along a return light path,
      a photosensitive array to detect the response light returning along the return light path in a second collimated beam, and
      a processor to determine a temperature of the substrate based on the detected response light.

2. The processing system of claim 1, further comprising a chamber lid mounted on the chamber body, wherein the chamber lid includes a lid window, and wherein the optical lens directs the excitation light through the lid window toward the support member.

3. The processing system of claim 2, further comprising a radio frequency (RF) coil over the chamber lid, wherein the RF coil is around a central region, and wherein the light source and the photosensitive array are outside of the central region.

4. The processing system of claim 3, wherein the photosensitive array is a charge coupled device type or an avalanche photo diode type.

5. The processing system of claim 3, further comprising an image transfer element containing the forward light path between the light source and the optical lens.

6. The processing system of claim 5, wherein the image transfer element contains the return light path between the optical lens and the photosensitive array.

7. The processing system of claim 1, wherein the substrate has a wafer form factor.

8. The processing system of claim 7, wherein the substrate includes a silicon substrate, and a phosphorescent coating on a top surface of the silicon substrate.

9. The processing system of claim 8, wherein the phosphorescent coating covers the top surface of the silicon substrate.

10. The processing system of claim 9, wherein the substrate includes an optically transparent protective layer on the phosphorescent coating.

11. The processing system of claim 7, wherein the substrate includes a semiconductor material having a predetermined temperature-dependent bandgap.

12. A processing assembly, comprising:
    a process chamber having a chamber body around a chamber volume;
    a substrate mounted within the chamber volume; and
    an optical temperature measurement subsystem including
       a light source to emit an excitation light in a first collimated beam,
       an optical lens to diverge the excitation light along a forward light path to a top substrate surface of the substrate and to converge a response light returning from the top substrate surface along a return light path,
       a photosensitive array to detect the response light returning along the return light path in a second collimated beam, and
       a processor to determine a temperature of the top substrate surface based on the detected light.

13. The processing assembly of claim 12, wherein the substrate includes a silicon substrate and has a wafer form factor, and wherein the substrate includes a phosphorescent coating covering the silicon substrate.

14. The processing assembly of claim 13, wherein the substrate includes an optically transparent protective layer covering the phosphorescent coating.

15. The processing assembly of claim 12, wherein the substrate has a wafer form factor and includes a semiconductor material having a predetermined temperature-dependent bandgap.

* * * * *